C. H. R. JOERN.
BAKER'S OVEN.
APPLICATION FILED NOV. 1, 1909.
955,514.
Patented Apr. 19, 1910.
3 SHEETS—SHEET 1.
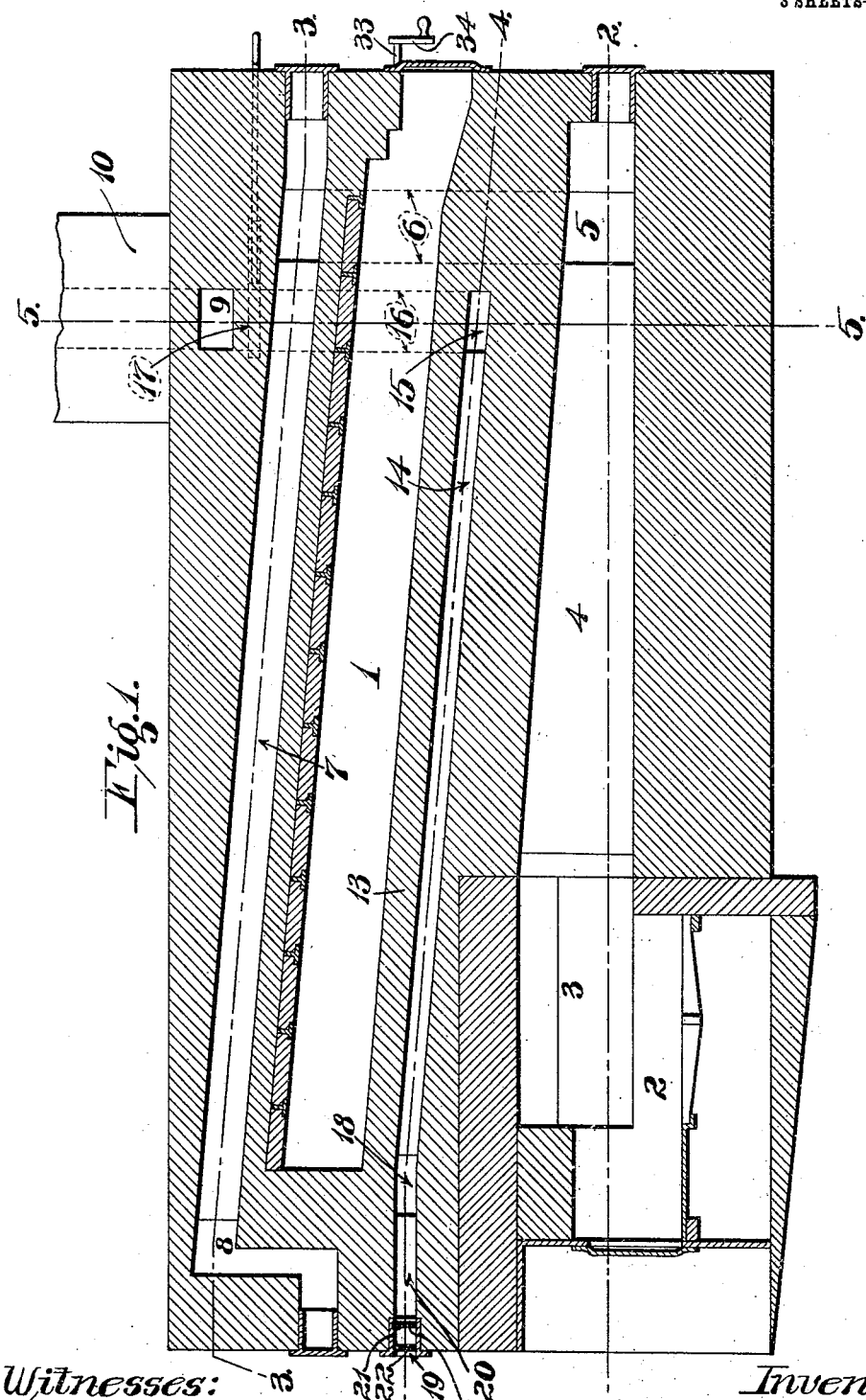

C. H. R. JOERN.
BAKER'S OVEN.
APPLICATION FILED NOV. 1, 1909.
955,514.
Patented Apr. 19, 1910.
3 SHEETS—SHEET 2.
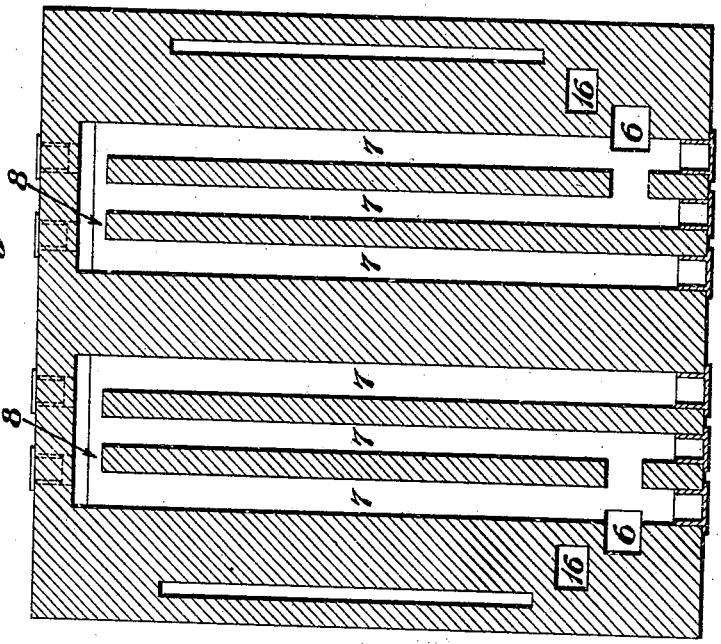
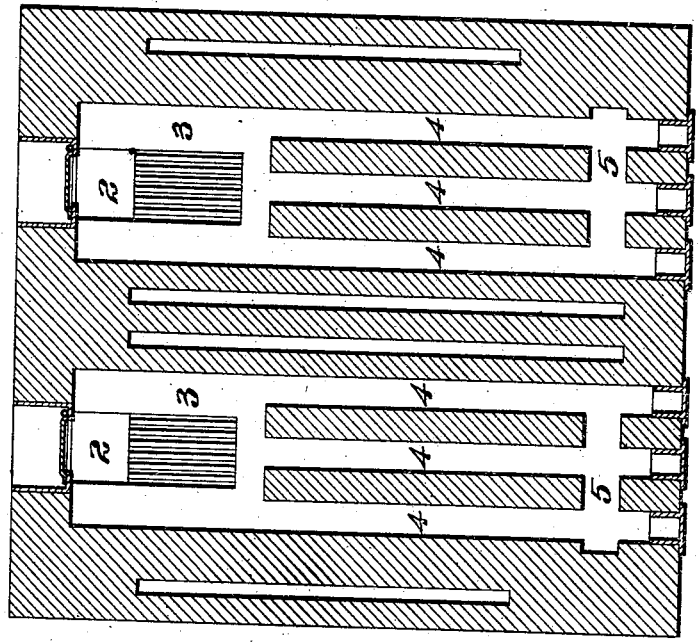
Witnesses:
Edgar T. Farmer.
G. A. Pennington
Inventor:
Charles H. R. Joern,
By Carr & Carr
Attys.

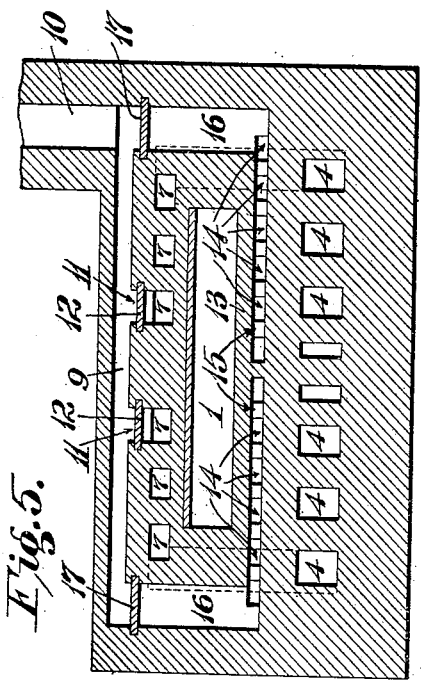
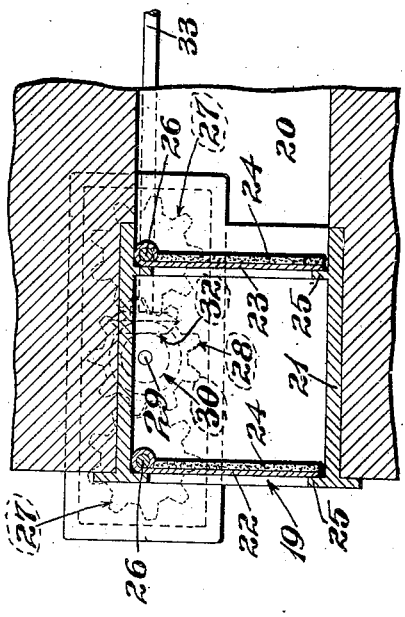
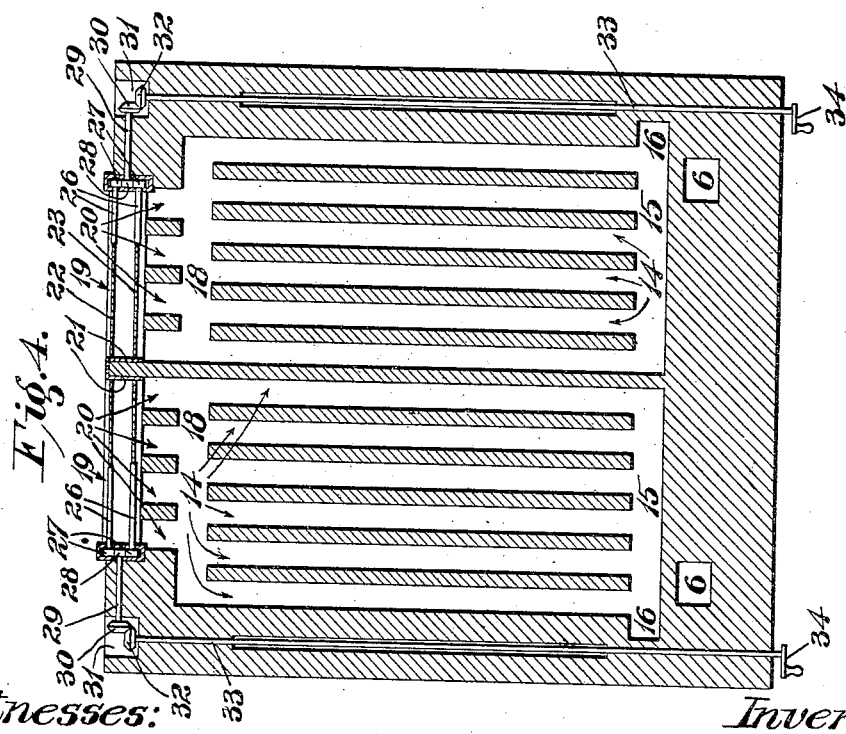

UNITED STATES PATENT OFFICE.

CHARLES H. R. JOERN, OF ST. LOUIS, MISSOURI.

BAKER'S OVEN.

955,514.　　　　Specification of Letters Patent.　　Patented Apr. 19, 1910.

Application filed November 1, 1909. Serial No. 525,685.

*To all whom it may concern:*

Be it known that I, CHARLES H. R. JOERN, a citizen of the United States, and a resident of the city of St. Louis and State of Missouri, have invented a certain new and useful Improvement in Bakers' Ovens, of which the following is a specification.

This invention relates to bakers' ovens and more particularly to ovens which are constructed of brickwork or other masonry.

It has for its principal objects to secure a perfect regulation of temperature, and to attain certain advantages hereinafter more fully appearing.

The invention consists in the parts and in the arrangements and combinations of parts hereinafter described and claimed.

In the accompanying drawings which form part of this specification and wherein like symbols refer to like parts wherever they occur, Figure 1 is a longitudinal section through a baker's oven embodying my invention; Fig. 2 is a horizontal section, on a reduced scale, through the combustion chamber and lower heating flues of the oven, on the line 2—2 of Fig. 1; Fig. 3 is a horizontal section through the upper heating flues, on the line 3—3 of Fig. 1; Fig. 4 is a horizontal section through the air chamber which is located under the hearth, on the line 4—4 of Fig. 1; Fig. 5 is a transverse vertical section on the line 5—5 of Fig. 1; and Fig. 6 is an enlarged fragmentary section illustrating the door-mechanism at the inlet end of the air chamber.

The oven may be constructed of brickwork or any other suitable masonry which is usually employed for such purposes. The oven shown is of the peel type and the baking chamber 1 is arranged at an incline or downward pitch from the rear to the mouth thereof. The hearth and walls of the baking chamber are constructed of brickwork; and the sides or top may be lined with tiles or the like, if desirable. The furnace 2 and combustion chamber 3 are located at the rear of the oven; and extending forwardly therefrom, are heating flues 4 which are connected at their front ends by a cross flue 5. The cross flue 5 communicates with an uptake flue 6 which leads to a set of flues 7 which extend longitudinally above the baking chamber. As shown more clearly in Fig. 3 of the drawings, a pair of the flues lead from the uptake flue 6 to a cross flue 8 which connects with the return flue. The return flue opens into a flue 9 which leads to the stack or chimney 10. The opening 11 between the return flue and the flue 9 which leads to the stack is controlled by a damper 12. The oven illustrated in the drawing is provided with two separate furnaces and two separate sets of flues. However, in some cases, a single furnace and arrangement of flues will be sufficient.

Located between the hearth 13 of the baking chamber 1 and the lower heating flues 4 and combustion chamber 3 is an air chamber comprising a series of longitudinal flues 14. These flues are connected at their front ends by a cross flue 15 which communicates with an uptake flue 16. The uptake flue 16 communicates with the flue 9 which leads to the stack or chimney 10 and it is controlled by a damper 17. The rear ends of the flues or passageways 14 are connected by a cross flue 18 which communicates with an inlet opening 19 in the rear wall of the oven through passageways 20. In the inlet opening is fitted a frame 21 in which are hinged two doors 22, 23. These doors are spaced apart so as to provide a dead-air space between them when closed; and for the purpose of insulation, the doors are lined with asbestos or other suitable material 24. The frame 21 is provided with flange portions 25 against which the doors are adapted to close.

It is desirable to manipulate the two doors 22, 23 simultaneously and a preferable arrangement is to mount the doors upon rods or shafts 26 which are provided at their ends with gears or pinions 27. The pinions 27 mesh with an intermediate gear or pinion 28 as shown in Figs. 4 and 6. The pinion 28 is mounted on a shaft 29 which is suitably journaled in the rear wall of the oven and has a beveled gear 30 thereon. The beveled gear is located in a niche or pocket 31 and it meshes with a second beveled gear 32 which is mounted on a rod or shaft 33. This rod 33 is journaled through the side wall of the oven and extends beyond the front wall so that a crank or manipulating device 34 may be provided thereon within convenient reach of an operator. By this arrangement the two doors 22, 23, may be simultaneously opened and closed by rotating the rod 33. As shown in Figs. 4 and 5 there are two separate air chambers beneath the baking chamber but it is obvious that a single chamber or a multiplicity of chambers may be provided if so desired. So, too, it is obvious that, in some cases, the furnaces may be located at the front of the oven; and, also, that the inlet opening for the air chamber may be located in the front wall.

The operation of the oven is as follows: When it is desired to fire the oven, the dampers are operated to open communication between the upper heating flues and the flue or passageway which leads to the stack. After the oven is fired, the draft is regulated by manipulating said dampers in the usual way. The doors at the inlet to the air chamber being closed, said air chamber constitutes a dead-air space beneath the hearth; and the oven is operated in the ordinary manner. However, should it be desired to reduce the temperature, and in many cases it is desirable to do so quickly, it is only necessary to open the doors which control the entrance to the air chamber and open the dampers which control the passageway leading to the stack, whereupon outside air is drawn in through the chamber beneath the hearth. As soon as the temperature of the oven has been reduced to the proper degree, the doors are closed and the chamber again becomes a dead-air space. In some cases, however, the doors may be left either fully or partially open.

In baking a quantity of goods of the same kind and condition, it is desirable to have the rear portion of the oven at a lower temperature than the front portion for the reason that the goods which are first placed in the baking chamber at the rear thereof are the last to be removed. Therefore, unless the temperature can be controlled and regulated as above set forth, the goods in the front portion of the oven might necessarily have to be removed before they are completely baked, or the goods in the rear portion of the chamber will be overbaked before they can be removed. So, too, some goods require a very hot and quick oven, whereas others require a lower temperature or slow oven; and in some cases, it is necessary that the temperature be quickly reduced for the reason that the condition of the unbaked goods to be placed in the oven is such that delay would cause them to spoil.

Obviously, the hearth and walls of the baking chamber which are constructed of brickwork or stone require considerable time to be heated up to the proper degree and, also, that when once heated, considerable time would be required to reduce the temperature unless special provisions were made for the purpose. I am aware that dead-air spaces have been provided under the hearths of ovens of this character, and, also, that attempts have been made to establish a circulation of cold air through the air chamber to reduce the temperature of the baking chamber. However, the intake for the cold air has been located at a point remote from the air chamber, and the air has been conducted through passageways in the side walls for a considerable distance before it enters the air chamber, with the result that the air has become heated before it enters the air chamber so that it has but little effect in reducing the temperature unless circulation is maintained for a considerable period. By my arrangement of taking the outside air direct into the chamber and arranging a direct series of flues, the desired effect is quickly accomplished. So, too, it is preferable to locate the intake at the rear of the oven in order to insure a reduction of temperature at the rear portion of the baking chamber to a greater degree than at the front portion thereof. In some cases, however, the intake may be located in the front wall with satisfactory results.

Obviously, the device admits of considerable modification without departing from my invention. Therefore, I do not wish to be limited to the specific construction and arrangement shown.

What I claim as my invention and desire to secure by Letters Patent is:

1. A baker's oven comprising a baking chamber, a furnace, heating flues located below the baking chamber and communicating with the furnace, heating flues located above the baking chamber, an uptake connecting the flues above and below the baking chamber, a flue connecting the heating flues above the baking chamber with a stack, an air chamber between the bottom of the baking chamber and the heating flues thereunder, said air chamber having a direct inlet opening which communicates with the outside air, and said air chamber also having a flue connection with the stack, and means for closing said chamber.

2. A baker's oven comprising a baking chamber, a furnace, heating flues below the baking chamber, a flue connecting said heating flues with a stack, an air chamber located between the bottom of the baking chamber and the heating flues thereunder, said air chamber having a direct inlet opening which communicates with the outside air, and an outlet flue connecting said chamber with the flue leading to the stack.

3. A baker's oven comprising a baking chamber whose hearth and walls are constructed of masonry, a furnace, heating flues under the hearth of said baking chamber, a flue connecting said heating flues with a stack, an air chamber located between the hearth and the heating flues thereunder, said air chamber having a direct inlet opening which communicates with the outside air, and an outlet flue connecting said chamber with the flue leading to the stack.

4. A baker's oven comprising a baking chamber, a furnace, heating flues under said baking chamber, heating flues above said baking chamber, said heating flues being connected with a stack, an air chamber located between the bottom of the baking chamber and the heating flues thereunder, said air chamber being connected with the stack, a damper for controlling the communication between the air chamber and the stack, said air chamber having a direct inlet opening which communicates with the outside air, and a controlling device for said inlet opening comprising two doors which are spaced apart to provide a dead-air space between them when they are closed.

5. A baker's oven comprising a baking chamber, a furnace, heating flues under said baking chamber, an air chamber between the bottom of the baking chamber and said heating flues, said air chamber having a direct inlet opening at its rear, which communicates with the outside air, means for making said air chamber a dead-air space, and means for establishing a draft through said air chamber.

6. A baker's oven comprising a baking chamber, a furnace, heating flues under said baking chamber, two or more air chambers between the bottom of said baking chamber and said heating flues, said air chambers having separate direct inlet openings from the outside air at their rear ends, means for creating a draft through said air chambers, and means for controlling the inlet openings, said means comprising a pair of doors in each of the inlet openings which are spaced apart so as to provide a dead-air space between them when they are closed, and means for simultaneously actuating the pair of doors in the respective inlet openings.

7. A baker's oven comprising a baking chamber, a furnace, heating flues under said baking chamber, an air chamber between the bottom of said baking chamber and said heating flues, said air chamber having a direct inlet opening which communicates with the outside air, means for creating a draft through said air chamber, and means for controlling the inlet opening, said means comprising two doors which are spaced apart so as to provide a dead air space between them when they are closed, said doors being hinged on transversely journaled rods having a gear on their ends, a shaft having a gear thereon which is located between the gears on said rods and meshes therewith, and means for rotating said last mentioned rod.

8. A baker's oven comprising a baking chamber whose hearth and walls are constructed of masonry, an air chamber under the hearth, said air chamber having a direct inlet opening at its rear which communicates with the outside air, means for controlling said air inlet opening, and means for creating a draft through said air chamber.

9. A baker's oven comprising a baking chamber whose hearth and walls are constructed of masonry, an air chamber under the hearth, said air chamber having a direct inlet opening at its rear which communicates with the outside air, means for creating a draft through said air chamber, and means for controlling said air inlet opening, said controlling means comprising a pair of doors which are spaced apart so as to provide a dead-air space between them when they are closed, and means for simultaneously actuating said doors.

Signed at St. Louis, Missouri, this 27th day of October, 1909.

CHARLES H. R. JOERN.

Witnesses:
G. A. PENNINGTON,
J. B. MEGOWN.